Patented Apr. 20, 1943

2,316,967

UNITED STATES PATENT OFFICE 2,316,967

OIL BASE DRILLING FLUID AND METHOD OF REGENERATING THE SAME

George Miller, San Marino, Calif.

No Drawing. Application June 24, 1941,
Serial No. 399,510

6 Claims. (Cl. 252—8.5)

This invention relates to an oil base drilling fluid for use in drilling wells and to a method of regenerating such oil base drilling fluid where the same becomes contaminated with water.

Oil base drilling fluids are mainly used while drilling through oil or gas producing formations, but are also used to combat hydrous disintegrating shales, or caving formations. Where aqueous mud fluids are employed during drilling through a productive formation, the permeability of the formation is appreciably reduced as a result of the watering or mudding of the formation by the mud fluid. For this reason, oil base drilling fluids are preferred for drilling through productive formations. Non-aqueous drilling fluids of certain types have the advantage that they do not lose water into the productive formations and will readily deplaster.

The general properties desired in an oil base drilling fluid are that the viscosity of the fluid must be within allowable limits, the fluid should maintain a good gel strength throughout the temperature range to be encountered, the fluid should possess good plastering properties and leave the formation in a condition to be readily deplastered, the drilling fluid should be susceptible of manufacture with a weight range of at least from 68 to 90 pounds per cubic foot, and the fluid should be capable of regeneration to remove water after the fluid becomes contaminated therewith.

It is the general object of the present invention to provide an oil base drilling fluid possessing all of the aforesaid desirable properties.

It is a further object of the present invention to provide a process by which an oil base drilling fluid may be readily and economically regenerated whenever the same becomes contaminated with water.

To provide the gel strength desired in an oil base drilling fluid, the art has previously employed lamp black. When lamp black is employed for this purpose, the viscosity and gel strength of the fluid is satisfactory at ordinary temperatures but is unsatisfactory at higher temperatures. Furthermore, a drilling fluid containing lamp black is very disagreeable to handle and has been the cause of much labor difficulty. The present invention includes the discovery that a superior oil base drilling fluid is provided by including in the drilling fluid a material, which material will slake in contact with water with the evolution of much heat. Calcium oxide and strontium oxide are examples of materials which slake in contact with water with the evolution of much heat. An excess of such materials over that necessary to combine with water may be employed. When such an excess is employed, the excess material initially acts as an inert weight material, but functions to prevent the drilling fluid from becoming undesirably contaminated with water. Any tendency of the drilling fluid in operation to become contaminated with water is offset by the excess material slaking with such water to form relatively insoluble hydroxides.

The preferred material for use in the present invention is calcium oxide. When calcium oxide is employed, it reacts with water in accordance with the following equation to form calcium hydroxide, a material which increases the gel strength of the drilling fluid:

$$CaO + H_2O = Ca(OH)_2$$

The reaction between calcium oxide and water not only produces a material which adds to the gel strength of the fluid, but also aids in the plastering properties of the fluid. Moreover, certain fluids employing calcium oxide are unaffected by water contamination up to at least 15% by volume, and by heating up to 260° F. I have further found that during the use of an oil base drilling fluid the water content of the drilling fluid may be maintained at a desirable low value by routine additions of calcium oxide. Part of the advantages of the drilling fluid of the present invention are undoubtedly due to the better dispersion of the asphalt in the drilling fluid effected by the heat generated when the calcium oxide is slaked with water.

Other materials may be employed in place of calcium oxide and serve the purpose of chemically combining with water, seeking to contaminate the drilling fluid, to thereby remove the water from the oil base drilling fluid. Among the other materials which I have found suitable for this purpose are magnesium oxide and anhydrous copper sulphate.

With the drilling fluid of the present invention water will not be taken from the drilling fluid by the oil sands, nor can water wet any of the ingredients of the drilling fluid which might thereby promote settling of such ingredients from the drilling fluid.

While each of the materials described has the advantage of chemically combining with water to remove the water from the oil base drilling fluid, the materials, calcium oxide and magnesium oxide, in addition so combine with the water as to have the property of producing a good gel strength in the drilling fluid, thereby acting to provide for the formation of a permanent drilling fluid from which the weighting material will not separate. In certain cases it is found that the use of voluminous magnesium oxide results in an excessive gel strength when used in connection with certain types of asphalt. Only calcium oxide, however, slakes in water with the evolution of much heat and is capable of adequately dispersing the asphalt of the drilling fluid and of improving the plastering properties of the drilling fluid. Furthermore, the gel strength provided by magnesium oxide is satisfactory over only a narrow temperature range, whereas the use of calcium oxide provides a drilling fluid with a satisfactory gel strength over a comparatively wide temperature range as hereinafter pointed out. The materials—strontium oxide and anhydrous copper sulphate—while combining with water to remove the same from drilling fluids do not improve the gel strength of the drilling fluid and should, therefore, be used only in connection with the drilling fluid containing some other agent for providing the desired gel strength, such as calcium or magnesium hydroxides. Of the foregoing materials, calcium oxide is at present the cheapest, while magnesium oxide compares in price range with the price range of lamp black, but the cost of the other mentioned agents is such at the present time as to make their use less desirable.

Copper sulphate is most effective from a weight and ratio standpoint for the purpose of removing water and thereby regenerating the oil base drilling fluid. It will be noted also that strontium oxide is the least effective from this standpoint. The difference in ratio between calcium oxide and magnesium oxide indicates that magnesium oxide is the most effective as regards regeneration of the non-aqueous drilling fluid. Magnesium oxide increases the viscosity and gel strength of the drilling fluid, but does not improve the plastering properties, as is the case with calcium oxide. I have found that the light and fluffy varieties of magnesium oxide impart an excessive gel strength to the drilling fluid both before and particularly after hydration, so that where magnesium oxide is to be employed I prefer to use the denser varieties of magnesium oxide, such as dead-burned magnesium oxide. Calcium oxide has the advantage over voluminous magnesium oxide not only in that it improves the plastering properties of the drilling fluid, but also in that it is more effective as a weighting material.

The drilling fluid and method of regenerating fluids of the present invention, together with various additional advantages of the invention, will be apparent from the following description of the preferred specific examples of drilling fluids embodying my invention.

In the preferred form of the invention, I employ stove oil or gas oil as the oil base of the fluid. For weighting material I employ calcium carbonate, oyster shell lime, or barytes. For providing the desirable viscosity and plastering properties, as well as part of the gel strength of the fluid, I employ either air-blown asphalt or mineral rubber. For providing gel strength, and improved plastering properties, I employ calcium oxide and water. As one example of a preferred drilling fluid, I employ such ingredients in the following proportions:

Table

| Per cent by weight | Material |
|---|---|
| 50 | Stove oil or gas oil. |
| 33 | Calcium carbonate or oyster shell lime. |
| 13 | Blown asphalt or mineral rubber. |
| 3.02 | Calcium oxide } 4% by weight calcium hydroxide. |
| 0.98 | Water |

The foregoing oil base drilling fluid has been shown to be unaffected by temperatures up to 260° F., or by water contamination up to over 11% by volume, and in some tests it has been shown that there is no harmful effect noticeable upon the drilling fluid by contamination with water up to 15%, or slightly greater quantities of water. During the use of such drilling fluid in oil drilling operations, the drilling fluid may be readily regenerated by periodic appropriate additions of calcium oxide or other material in suitable proportion to combine with the water contaminating the drilling fluid and thereby removing the water from the drilling fluid. For the purpose of maintaining the drilling fluid throughout drilling operations non-aqueous in character, the practice of making routine additions of the material to the drilling fluid may be followed.

While I have described the employment of calcium carbonate or oyster shell lime as the weighting material, it is obvious that any suitable or desirable form of weight material may be utilized. It is also possible in accordance with the present invention to initially produce an oil base drilling fluid which will be self-regenerating, and for this purpose it is only necessary to include in the initial composition of the drilling fluid a sufficient excess of the calcium oxide so as to provide for the desired self-regenerating properties. Such an excess of calcium oxide merely acts as additional weighting material until there is a tendency of the drilling fluid to become contaminated with water. The weight of calcium oxide closely approximates the weight of the weight material desirable for the drilling fluid. By the use of an excess of calcium oxide, it will be apparent that as additional water is taken up by the drilling fluid from the surroundings or from the drilling hole or oil sand, this water reacts with the calcium oxide in producing a further quantity of hydrated lime or gel material, and in a way not detrimental to the drilling fluid itself.

To illustrate the process of regenerating the oil base drilling fluids of the present invention, in one example, an oil base drilling fluid was employed having an original composition of 50% stove oil, 31% oyster shell lime, 14% asphalt, and 5% hydrated lime produced by the addition of approximately 3.78% calcium oxide, and 1.22% water. This drilling fluid had a weight of 72 pounds per cubic foot. After contamination of this drilling fluid with water up to 6.0% by volume, there was added approximately 6.8% by weight of calcium oxide, and the water content of the drilling fluid was thereby reduced to 1.2% by volume (A. S. T. M. test) free water, while the properties of the drilling fluid were improved slightly over the original fluid, especially at high temperatures.

In another example of the process of the present invention, the same drilling fluid contaminated by water was regenerated by the addition of approximately 6.8% of magnesium oxide. This reduced the water content of the drilling fluid to 0.65% (A. S. T. M. test). While the addition of the magnesium oxide was thus more effective in removing water than the addition of the calcium oxide, the regenerated drilling fluid was less satisfactory from the standpoint of its properties of plastering and viscosity than was the case of the mud regenerated by the use of calcium oxide. As a further example in another case, the same drilling fluid contaminated with water was regenerated by the addition of approximately 6.8% anhydrous copper sulphate. This reduced the water content to 3.6% (A. S. T. M. test), while the properties of the drilling fluid remained otherwise substantially unchanged.

In another example of the invention, the drilling fluid was made originally containing 50% stove oil, 31% oyster shell lime, 14% asphalt, and 5% magnesium hydroxide produced through the addition of magnesium oxide and water. This drilling fluid weighed 72 pounds per cubic foot. This drilling fluid was then contaminated with 6% water, and it was noted that the addition of the water had substantially no effect on the properties of the drilling fluid. Approximately 5.45% of magnesium oxide was then added to the drilling fluid for the purpose of regenerating the same. The water was found to be reduced to 2.3% (A. S. T. M. test).

As a further example of the drilling fluid embodying the present invention, a drilling fluid was prepared originally having a composition consisting of 50% stove oil, 31% oyster shell lime, 14% asphalt, and 5% hydrated lime produced by the addition of appropriate quantities of calcium oxide and water. Such a drilling fluid weighed 72 pounds per cubic foot. In order to provide such drilling fluid with self-regenerating properties, there was then added an additional 3.7% calcium oxide. It was found that the plastering properties of the drilling fluid were improved, that the viscosity remained about the same as before, and that the gel properties remained satisfactory at temperatures as high as 200° F. This drilling fluid had the property of maintaining itself free from water contamination when an additional 1.4% water was added.

While the particular oil base drilling fluid and the method of regenerating the same herein described are well adapted to carry out the objects of the present invention, it is to be understood that various modifications may be made, and the invention is of the scope set forth in the appended claims.

I claim:

1. A process of maintaining an oil base drilling fluid substantially free of water during drilling operations, which includes routine addition thereto of substantial amounts of unslaked calcium oxide whereby the water content of the drilling fluid is maintained at substantially zero.

2. The method of regenerating a water contaminated non-aqueous drilling fluid, which comprises, adding unslaked calcium oxide to said drilling fluid to combine with said water, said unslaked calcium oxide being added in sufficient amount to reduce the water content of said fluid to a value which has no material effect upon the properties of said non-aqueous drilling fluid.

3. The method of regenerating a water contaminated oil base drilling fluid containing an asphalt and a weighting material including slaked calcium oxide, which comprises adding to said drilling fluid sufficient unslaked calcium oxide to combine with substantially all of said water.

4. A non-aqueous drilling fluid comprising a mineral oil, a weighting material, and a substantial proportion of unslaked calcium oxide.

5. A non-aqueous drilling fluid comprising a mineral oil, an asphalt, a weighting agent including slaked calcium oxide and a substantial proportion of unslaked calcium oxide.

6. A light weight non-aqueous drilling fluid having a weight range of 68 to 90 pounds per cubic foot, comprising a mineral oil, a weighting material including slaked calcium oxide, an asphalt, and a substantial proportion of unslaked calcium oxide.

GEORGE MILLER.